United States Patent [19]

Rappas et al.

[11] 4,148,815

[45] Apr. 10, 1979

[54] AMINO-THIOL NICKEL AND COBALT SOLVENT EXTRACTION

[75] Inventors: Alkis S. Rappas, Bedford; J. Paul Pemsler, Lexington, both of Mass.

[73] Assignee: Kennecott Copper Corporation, New York, N.Y.

[21] Appl. No.: 831,552

[22] Filed: Sep. 8, 1977

[51] Int. Cl.$^2$ .................. C07F 15/04; C07F 15/06
[52] U.S. Cl. .................. 260/439 R; 423/139; 423/149; 423/418; 75/101 BE
[58] Field of Search .............. 423/139, 149, 417, 418, 423/658.5; 75/101 BE, 119; 260/439 R, 609 R, 561 S, 562 S, 583 EE

[56] References Cited

U.S. PATENT DOCUMENTS

| | | | |
|---|---|---|---|
| 2,412,700 | 12/1946 | Weissberger et al. | 260/562 S |
| 3,335,054 | 8/1967 | Reynolds et al. | 260/583 EE |
| 3,369,876 | 2/1968 | Grimm | 260/439 R |

OTHER PUBLICATIONS

Belcher et al., *New Methods of Analytical Chemistry*, 2nd Edition, Reinhold Pub. Corp., N.Y. (1964), p. 254.
Marcus et al., *Ion Exchange and Solvent Extraction of Metal Complexes*, Wiley-Interscience, NY (1969), pp. 94–96, 927, 928, 932, 933.
Mehrotra, R. et al., "Thiol and Thio-$\beta$-Diketone Derivatives of Some Elements," *Inorganic Chimica Acta Reviews*, (1968) pp. 111–116.
Swan, C. et al., "Complexes of Co, Ni, Tl, Pd with Some Mercapto Compounds" *Chemistry and Industry*, 8/12/67, pp. 1363–1364.

*Primary Examiner*—Brian Hearn
*Attorney, Agent, or Firm*—John L. Sniado; Anthony M. Lorusso

[57] ABSTRACT

A novel class of extractants and a method of using the extractants in the hydrometallurgical recovery of nickel and cobalt metal. The extractants comprise a water immiscible organic solvent system containing solubilized mercaptide anion. In an important embodiment of the invention, the mercaptide anions are generated by adding compounds containing both a thiol group and an amine group such as aminoethanethiols or amides of thioglycolic acids to water immiscible organic solvents, preferably of polar character. These systems generate the required mercaptide anions by undergoing an internal acid dissociation.

The extractants are used by being contacted with cobalt, nickel, or cobalt and nickel pregnant aqueous solutions. On mixing, the cobalt and/or nickel values are taken up by the organic as cobalt and nickel mercaptides. These may then be stripped of cobalt and nickel by treatment with an aqueous alkaline solution and carbon monoxide.

6 Claims, No Drawings

AMINO-THIOL NICKEL AND COBALT SOLVENT EXTRACTION

BACKGROUND OF THE INVENTION

This invention relates to novel organic extractants for removing cobalt and nickel values from aqueous solutions.

It is known that nickel can be recovered from its concentrated acidic solutions by electrowinning. However, if the nickel solution is ammoniacal, or if the solution is too dilute, then the nickel ions must be extracted by liquid ion exchange and back extracted into a sulfuric acid solution before being electrowon. The purity of the nickel obtained from such a process is very sensitive to the nature and concentration of the impurities present in the solution.

It is also known that nickel can be obtained from its solutions by hydrogen reduction at elevated temperatures and pressures. Typically, nickel won by this method is very impure.

Because of the difficulties of the foregoing nickel recovery processes, carbonylation processes for recovering nickel and cobalt have recently been developed. In the carbonylation process, very pure nickel and cobalt of acceptable purity are obtained by treating nickel and cobalt values to produce carbonyl compounds. The gaseous compound $Ni(CO)_4$ is then isolated and thermally decomposed to yield pure metal pellets and carbon monoxide gas. The purity of the nickel metal produced by this process is excellent because of the selectivity of the carbonylation reaction and because other metals often present with nickel do not form gaseous compounds.

SUMMARY OF THE INVENTION

The instant invention is based on the discovery that cobalt and nickel may be extracted from an aqueous phase to an organic phase by mercaptide anions solubilized in the organic phase in accordance with the equation:

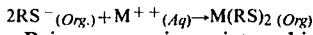

where R is an organic moiety which renders the $RS^-$ anion substantially water insoluble and $M^{++}$ is $Co^{++}$ or $Ni^{++}$. In contrast, mercaptans (RSH) have been observed not to be capable of extracting cobalt or nickel, unless somehow dissociated to form the $RS^-$ ion.

The foregoing discovery provides a basis for the provision of a number of novel cobalt and nickel organic extractants. All comprise a substantially water immiscible organic solvent or solvent system capable of solubilizing nickel and/or cobalt mercaptide and a compatible, substantially water insoluble mercaptide anion solubilized therein.

One important embodiment of the extractant of the invention comprises a substantially water immiscible organic solvent containing a solubilized compound such as:

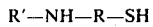

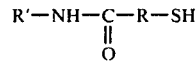

wherein R' is hydrogen, an alkyl group containing 1–20 carbon atoms, aryl substituted alkyl groups containing between 1 and 12 carbon atoms, and aryl groups substituted with a radical such as hydrogen, halogen, and lower alkyl. R is a lower alkyl group containing 1–10 carbon atoms. Preferred species of compound 1 are alkyl aminoethanethiols ($R=-CH_2-CH_2-$). Preferred species of compound 2 are amides of thioglycolic acid ($R=-CH_2$). R' preferably comprises alkyl having 5 to 20 carbon atoms or aryl substituted alkyl containing between 1 and 12 carbon atoms. The mercaptan compounds of the extractant produce mercaptide anion in accordance with a reaction which is believed to be as follows:

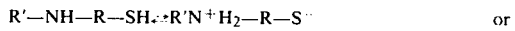

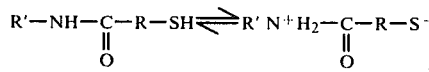

Thus, an internal proton shift resulting in an acid dissociation of the thiol group and the formation of a quaternary ammonium species provides the required mercaptide anion.

The organic solvent selected for use with this extractant will preferably promote the foregoing reaction. Accordingly, polar organic solvents are preferred, e.g., amines, alcohols, or mixtures of such compounds.

In the process of the invention, one of the foregoing extractants is contacted by an aqueous solution containing cobalt, nickel, or both, and at least a portion of the metal values are extracted into the organic phase as cobalt or nickel mercaptides.

Accordingly, it is an object of the invention to provide a class of mercaptide anion based cobalt and nickel extractants.

Another object is to provide solvent systems for an organic extractant which systems are capable of solvating mercaptide anion and nickel and cobalt mercaptides.

Another object of the invention is to provide organic, water immiscible extractants which exchange hydrogen ions for nickel and cobalt ions.

Still another object of the invention is to provide an extractant that results in cobalt and nickel mercaptides solvated in an organic phase, which mercaptides may be easily stripped of their metal values in the presence of carbon monoxide and an aqueous alkaline solution.

DESCRIPTION OF A PREFERRED EMBODIMENT

There are many sources of aqueous nickel and cobalt containing pregnant liquors which may be treated in accordance with the instant invention. Both ammoniacal and non-ammoniacal solutions of nickel and/or cobalt carbonate, sulfate, hydroxide, etc. may be successfully utilized. The presence of solubilized iron or copper in the solution to be treated by the extractant of the invention is detrimental since these ions compete with cobalt and nickel in the reactions upon which the extraction depends. Accordingly, it is contemplated that the best results will be achieved when the processes herein disclosed are operated downstream from a copper and/or iron extraction system. In this situation, the copper and iron free raffinate of the upstream system or systems makes an ideal liquor for use in the process of the instant invention. One particularly well suited copper removal process is disclosed in U.S. Pat. No. 4,033,765, entitled Improvements in the Extraction of Copper from Solutions by Reduction with Anthraquinols, to John N. Gerlach. This process, in addition to removing copper from the solution, utilizes hydrogen as a reducing agent. Accordingly, it is contemplated that synthesis gas could be used to drive an overall copper, cobalt and nickel winning procedure, hydrogen being used to reduce the copper, and carbon monoxide being used in accordance with the instant process to produce cobalt and nickel.

Nonlimiting examples of liquors which may be treated by the process of the invention, methods for their production, and ores from which they may be obtained are disclosed in U.S. Pat. Nos. 3,772,423 to Stevens et al.; 2,576,314 to F. A. Forward; 2,726,934 to Forward et al.; 3,088,820 to Mackiw et al.; 3,644,144 to Vosahlova, and, perhaps most notably, 3,728,105 to R. R. Skarbo, which discloses a method of extracting nickel and cobalt from deep sea manganese nodules.

The processes of the invention require a water immiscible extractant comprising an organic solvent or solvent system and solubilized mercaptide anion. It has now been discovered that, as a general phenomenon, mercaptide anion having the general formula $RS^-$ is capable of complexing with nickel and cobalt when dissolved in an organic solvent to produce organic solvent soluble $(R-S)_2Ni$ and $(R-S)_2Co$. R can be any one of an extremely large number of organic radicals. An essential property of the radical selected for R is that it render both the mercaptide anions and the resulting nickel and cobalt mercaptides soluble in the organic solvent system selected. Thus, the mercaptide anion and the solvent system will be matched in accordance with the teachings herein disclosed to produce a homogeneous, water immiscible solution capable of removing nickel and cobalt ions from aqueous solutions and of solvating the nickel and cobalt mercaptides thereby produced.

The ability of the composition of matter of the invention to function as an extractant depends on the presence of mercaptide anion solubilized in the organic, water immiscible solvent. Accordingly, mercaptans and mercaptide salts, if undissociated, cannot extract cobalt and nickel values. Thus, the solvent system and/or the mercaptan or mercaptide salt added to the system must be selected to effect dissociation so that mercaptide anion is present.

At present, several general approaches to producing mercaptide anions in water immiscible organic solvents have been developed. One approach is disclosed in U.S. application Ser. No. 831,501 entitled *Nickel and Cobalt Extractant and Method of Use* by A. S. Rappas et al., filed on even date herewith, the disclosure of which is incorporated herein by reference. Briefly, the approach involves solvating a mercaptan within a water immiscible solvent system, one component of which is a basic compound such as an amine. In the solvent, the acid hydrogen of the thiol group of the mercaptan dissociates, resulting in the production of mercaptide anion, and becomes associated with the amine to form a quaternary ammonium species.

Another approach is disclosed in U.S. application Ser. No. 831,501 entitled *Alkali Metal Mercaptide Organic Extractant and Method of Use,* to A. S. Rappas, et al. filed on even date herewith, the disclosure of which is incorporated herein by reference. In this extractant, the mercaptide anions are produced by solvating a sodium or potassium mercaptide in a specially designed water immiscible solvent capable of dissolving alkali metal ions.

In the extractant of this invention, the mercaptide anion is generated in the organic phase by adding compounds containing both a thiol group and an amine group such as amino alkyl thiols or amides of thioglycolic acids. Compounds of this type undergo an internal proton shift wherein the acid hydrogen of the thiol group dissociates and associates with the amine group to form a quaternary ammonium species. With this type of extractant, the nature of the solvent is not particularly critical, but polar solvents or solvent systems including at least one polar solvent are preferred since these promote dissociation.

To promote efficiency, the amino-thiol compound selected for use in the extractant should be highly insoluble in water, non-volatile, and free of double or triple bonds or other chemically active functional groups which might affect its stability. The compound should also form nickel and cobalt complexes which are easily stripped of nickel and cobalt in the presence of carbon monoxide, but should otherwise be inert to carbon monoxide, nickel carbonyl, or carbonyl cobaltate. As set forth hereinafter, an alkali metal hydroxide is required in the preferred stripping procedure of the nickel or cobalt loaded extractant. Accordingly, the mercaptide should ideally be selected such that it may be stripped of metal values in the presence of as dilute a concentration of alkali as possible. The pH of the pregnant liquor to be treated will also affect the decision as to which particular amino-thiol compound should be selected. Obviously, any particular amino-thiol compound utilized will represent a compromise among the foregoing properties. Specific compounds which have been found operable in the extractant of this invention include mercapto N-2-naphthylacetamide, thioglycolic acid anilide, 2-N-decylaminoethane thiol, 2-(p-fluoroaniline)-ethanethiol, and 2-N-diethylaminoethane thiol. A class of compounds useful in the extractant have the general formulae:

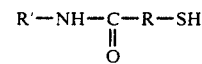

wherein R' is hydrogen, an alkyl group containing between 1 and 20 carbon atoms, or aryl substituted alkyl groups containing between 1 and 12 carbon atoms, and aryl groups substituted with a radical such as hydrogen, halogen, aryl, and lower alkyl having 1 to 6 carbon atoms. R is a lower alkyl group containing 1–10 carbon atoms. The presently preferred compounds of this class are those having the general formulae:

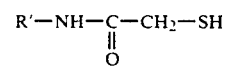

wherein R' is an alkyl group having between 5 and 20 carbon atoms or an aryl substituted alkyl group containing between 1 and 12 carbon atoms.

The compounds mentioned above are by no means an exhaustive list, and by way of further example, the following classes of compounds also have utility when dissolved in a suitable organic solvent.

1.

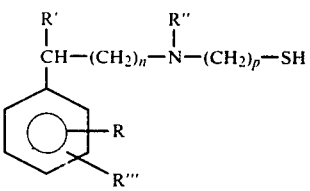

where:
n = 0, 1, 2, or 3
p = 2 or 3
R, R''' = H, aryl, or $C_1$-$C_6$
 (straight or branched,
 saturated only)
R' = H, or $C_1$-$C_3$
R'' = H, $C_1$ or $C_2$

2.

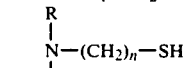

where:
n = 2, 3, or 4
R = H, $C_1$, $C_2$
R', R'' = H, aryl, or $C_1$-$C_6$
 (straight or branched,
 saturated only)

3.

$CH_3$—$(CH_2)_n$—N—$(CH_2)_p$—SH
                |
                R where:
n ≥ 3 (straight or branched,
 saturated only
p = 2 or 3
R = H, $C_1$ or $C_2$

4.

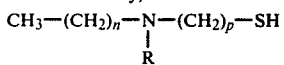

where:
n - 1, 2, or 3
R = H, $C_1$, or $C_2$
R'', R' = H, aryl, or $C_1$-$C_6$
 (straight or branched,
 saturated only)

5.

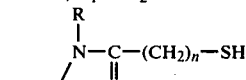

where:
n = 1, 2, or 3
R = H, $C_1$, or $C_2$
p = 0, 1, or 2
R''' = H, $C_1$, or $C_2$
R'', R' = H, aryl $C_1$-$C_6$
 (straight or branched,
 saturated only)

6.

$CH_3$—$(CH_2)_n$—N—C—$(CH_2)_p$—SH
                |   ‖
                R   O where:
n ≥ 3 (straight or branched,
 saturated only)
R = H, $C_1$ or $C_2$
p = 1, 2, or 3

7.

$CH_3$—$(CH_2)_n$—CH—$(CH_2)_p$—SH
                |
              $(CH_2)_m$—$NH_2$ where:
n ≥ 3
m = 0, 1, 2, or 3
p = 2 or 3

8.

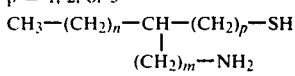

where:
m = 0, 1, 2, or 3
p = 2 or 3
R''' = H, $C_1$ or $C_2$
R', R'' = H, aryl, or $C_1$-$C_6$ To prepare the extractant of the invention, one or more of the foregoing compounds is solubilized in amounts up to its saturation point in a water immiscible solvent. Examples of suitable solvents include relatively inexpensive materials such as kerosene, xylene, toluene, and solvent naphtha. Preferably, the solvent also includes a compatible polar compound to provide a good environment for the proton shift which results in the generation of the mercaptide anion. Examples of suitable polar solvents include water immiscible alcohols and water immiscible amines.

If any of the foregoing extractants are contacted by cobalt and/or nickel containing aqueous solutions, organic solvent soluble nickel and cobalt mercaptides are produced. In general, at the temperature of the extraction (usually 40°-70° C.), there is a maximum possible metal loading in the organic phase in the range of 2-20 grams per liter of organic. For each mole of nickel or cobalt to be picked up in the organic phase, there should be at least 2.5 moles of RSH.

It has also been discovered that the loaded extractant containing nickel and/or cobalt mercaptide can be stripped of its cobalt and nickel content by exposing the loaded extractant to an aqueous alkaline solution, e.g., an NaOH, KOH, or Ca(OH)$_2$ solution, and carbon monoxide. Advantageously, stripping in this manner results in cobalt and nickel carbonyl compounds, typically gaseous nickel tetracarbonyl and water soluble carbonyl cobaltate salts. As is known, these substances are easily converted to valuable nickel and cobalt compounds or to extremely pure nickel metal and cobalt of acceptable purity. The extractants of this invention undergo carbonylate stripping with solutions containing only 12 to 20 g/l sodium hydroxide or potassium hydroxide, and 50-160 g/l sodium carbonate. This is in contrast to the alkali solution required to strip the cobalt and nickel mercaptide loaded extractant of the alkali metal mercaptide type extractant mentioned above, wherein a solution comprising greater than 30% by weight sodium hydroxide was found to be required for reasonable reaction rates. Furthermore, the extractant disclosed herein can be stripped using carbon monoxide and an aqueous suspension of Ca(OH)$_2$ of about 40 g/l.

One economically desirable aspect of stripping the loaded extractant with carbon monoxide as disclosed above is that such treatment simultaneously regenerates the mercaptide anion, which is produced in its alkali metal salt form. In general, it is preferred to exchange hydrogen for the alkali metal cations prior to reusing the extractant, as otherwise alkali metal ions are lost to the cobalt and nickel-free raffinate. A hydrogen ion exchange can be effected by treating the alkali metal mercaptide containing organic with an aqueous acidic solution. The preferred method of exchange is to treat the solution with carbonic acid, resulting in water soluble sodium carbonate from which NaOH can be regenerated with calcium oxide, thus conserving alkali.

Exemplary chemistry of the above-described processes is set forth below.

Extraction $$RSH \rightleftharpoons H^+ + RS^-$$

$$2H^+RS^-_{(org)} + Ni^{++}_{(aq)} \rightarrow (RS)_2Ni_{(org)} + 2H^+_{(aq)}$$

$$2H^+RS^-_{(org)} + Co^{++}_{(aq)} \rightarrow (RS)_2Ni_{(org)} + 2H^+_{(aq)}$$

Carbonylate Stripping $$(RS)_2Ni_{(org)} + 5CO + 4NaOH_{(aq)} \rightarrow Ni(CO)_4 + 2R\text{-}SNa_{(org)} + Na_2CO_3 + 2H_2O$$

$$2(RS)_2Co_{(org)} + 11CO + 12NaOH_{(aq)} \rightarrow 2Na[Co(CO)_4]_{(aq)} + 3Na_2CO_3 + 6H_2O + 4RSNa_{(org)}$$

$$(RS)_2Ni + 5CO + Ca(OH)_2 \rightarrow Ni(CO)_4 \uparrow + CaCO_3 \downarrow + RSH$$

Extractant Regeneration $$2RSNa + CO_2 + H_2O \rightarrow 2RSH + Na_2CO_3$$

$$2RSH \rightleftharpoons 2H^+ + RS^-$$

Caustic Regeneration $$Na_2CO_3 + CaO + H_2O \rightarrow 2NaOH + CaCO_3 \downarrow$$

A process which utilizes the above described organic, water immiscible extractant to recover cobalt and nickel metal is disclosed in detail in U.S. application Ser. No. 831,502 entitled *Method of Winning Nickel and Cobalt*, by A. S. Rappas et al., the disclosure of which is incorporated herein by reference.

One of the primary advantages of the process of the instant invention is that the foregoing reactions can take place at or close to ambient temperatures and pressures. However, as is well known, solubility is a temperature dependent phenomenon. Accordingly, if necessary, the extraction can be run at temperatures greater than 50° C. (e.g., up to 100° to 150° C). Furthermore, a pressure of 2 to 3 atmospheres is tolerable. That the reactions occur at moderate temperatures and pressures is important because no autoclaves need be employed.

In general, the pH of the cobalt and nickel containing solution to be treated should not be below about 3.5. In this regard the optimum pH depends on the acid dissociation constant of the particular mercaptan selected. Thus, when the acid dissociation reaction is $RSH \rightleftharpoons RS^- + H^+$, the acid dissociation constant $K_a$ will be:

$$K_a = [RS^-][H^+]/[RSH]$$

Since $RS^-$ s responsible for the extraction and since, for a given mercaptan, $K_a$ is a contant, it is obvious that the pH of the aqueous solution will affect the $RS^-$ concentration. Accordingly, in general, the greater the $H^+$ concentration, the smaller will be the $RS^-$ concentration. However, because the aminoethanethiols, etc. have a relatively high acid dissociation constant, the pH may be as low as about 3.5 for systems using nonpolar solvents. The addition of an amine or other polar solvent in the solvent carrier adapts the extractant for use on pregnant liquors of even lower pH.

As can be appreciated from the above, nickel tetracarbonyl and tetracarbonyl cobaltate ions are produced as a result of the stripping. Advantageously, nickel tetracarbonyl is a gaseous compound which may be removed from the reaction together with excess carbon monoxide. Normally, there will be no other metal present which can form gaseous compounds under the stripping conditions. Consequently, the nickel carbonyl, if subsequently broken down into nickel metal and carbon monoxide, produces an extremely pure nickel product. As is known in the art, nickel tetracarbonyl in the carbon monoxide off-gas stream can be concentrated, e.g., condensed under pressure or absorbed into a suitable solvent such as the type disclosed in U.S. Pat. No. 3,688,474 to M. D. Head et al. Once concentrated, the nickel carbonyl is easily thermally decomposed to pure nickel metal and carbon monixide gas which may be recycled.

The tetracarbonyl cobaltate formed during the carbonylate stripping of cobalt from the organic phase is soluble in the alkaline aqueous phase but insoluble in the organic phase. Accordingly, cobalt values in aqueous solution may be isolated from the organic phase via a liquid-liquid separation.

Laboratory experiments have demonstrated the technical feasibility of the extraction of cobalt and nickel from pregnant liquors using the various extractants of the type described herein and of the carbonylate stripping to yield nickel tetracarbonyl and tetracarbonyl cobaltate. In these experiments, the nickel carbonyl was transported in the carbon monoxide stream and oxidized in a series of nitric acid filled scrubbers. The amount of nickel transported as nickel tetracarbonyl and the amount of cobalt recovered as tetracarbonyl cobaltate from the alkaline carbonylate stripping solution were determined by atomic absorption.

The invention will be further understood from the following nonlimiting examples.

The organic extractants described below were prepared by mixing together various aminothiols and solvents at 50°–60° C. in the absence of oxygen (under argon). Unless otherwise specified, the aqueous nickel solutions used in the extractions contained about 3.8 g/l nickel together with ammonia and ammonium carbonate and the pH was 10.8. The aqueous cobalt solutions used in the extraction of example 12 contain 4.992 g/l cobalt. In examples 15 and 16, the aqueous cobalt solution was prepared by adding 0.84 ml of a 62.5 g/l cobalt stock solution (cobalt sulfate) to 24.16 ml of a nickel and copper-free aqueous solution containing ammonia, ammonium carbonate, and trace amounts of sodium and chloride.

The extractions were carried out in a batch reactor under an inert atmosphere and the nickel and/or cobalt concentrations determined in both the aqueous and organic phases. The two phases were mixed for 5 to 15 minutes to effect extraction. Usually, equilibrium was reached relatively quickly depending on mixing temperatures.

In the tables which follow, the volume percent of the components used in the preparation of the various extractants of the invention is given for each example, and the number of moles of each component included in the extractant per mole of aqueous nickel or cobalt in the test solutions is given.

EXAMPLE 1

| Component | Vol. % | Moles of Component Moles of Ni(or Co) |
|---|---|---|
| 1. 2-N-Decylaminoethanethiol | 10.2 | 3.0 |
| 2. Adogen 364 (organic amine, Ashland Co.) | 18.8 | 3.0 |
| 3. Decanol | 52.9 | 20.4 |
| 4. Xylene | 16.9 | 7.7 |

T = 55° C
Organic loading = 9.8g Ni/l

EXAMPLE 2

| | | |
|---|---|---|
| 1. 2-N-decylaminoethanethiol | 12.78 | 3.0 |
| 2. 2, 6 -diisopropylaniline | 38.55 | 12.0 |
| 3. decanol | 38.99 | 12.0 |
| 4. xylene | 9.68 | 3.5 |

T = 55° C
Organic loading = 11.3g Ni/l

EXAMPLE 3

| | | |
|---|---|---|
| 1. 2-N-Decylaminoethanethiol | 12.78 | 3.0 |
| 2. N,N-Dimethylbenzylamine | 18.41 | 12.0 |
| 3. Decanol | 38.99 | 12.0 |
| 4. Xylene | 29.82 | 10.9 |

T = 55° C
Organic loading = 11.2g Ni/l

EXAMPLE 4

| Component | Vol. % | Moles of Component Moles of Ni(or Co) |
|---|---|---|
| 1. 2-N-Decylaminoethanethiol | 12.78 | 3.0 |
| 2. Benzylmethylamine | 26.38 | 12.0 |
| 3. Decanol | 38.99 | 12.0 |
| 4. Xylene | 21.85 | 8.0 |

T = 55° C
Organic loading = 11.3g Ni/l

EXAMPLE 5

| | | |
|---|---|---|
| 1. 2-N-Decylaminoethanethiol | 12.78 | 3.20 |
| 2. N,N-Diethylcyclohexylamine | 37.34 | 9.34 |
| 3. Decanol | 38.99 | 9.75 |
| 4. Xylene | 10.89 | 2.72 |

T = 56° C
Organic loading = 11.3g Ni/l

EXAMPLE 6

| | Volume (ml) |
|---|---|
| 1. 2-N-Decylaminoethanethiol | 2.8 |
| 2. Decanol | 7.5 |
| 3. Kerosene | 15.0 |
| 4. Xylene | 4.7 |
| Total Volume = | 30.0 ml |

T = 56° C, 30 ml of extractant were mixed with 75.0 ml of a 4.08 g/l Ni solution.
Organic loading = 9.72g Ni/l

EXAMPLE 7

| | Volume (ml) |
|---|---|
| 1. 2-(p-fluoroanilino) - ethanethiol | 6.43 |
| 2. Decanol | 39.70 |
| 3. Adogen 364 (Ashland, Organic Amine) | 43.70 |
| 4. Xylene | 10.02 |
| Total = | 99.85 |

T = 40° C, 25 ml of extractant were mixed with 75.0 ml of the 3.8 g/l Ni solution.
Organic loading, after 2 minutes of mixing, was equal to 2.09 g Ni/l

EXAMPLE 8

| Component | Vol. % | Moles of Component Moles of Ni(or Co) |
|---|---|---|
| 1. 2-($\beta$-phenethylamino)-ethanethiol | 5.26 | 2.2 |
| 2. Decanol | 31.20 | 8.0 |
| 3. Xylene | 6.10 | 1.9 |
| 4. Primene-JMT (Rohm & Haas) | 8.09 | 1.1 |
| 5. Adogen 382 (Ashland) | 49.35 | 4.4 |

T= 50° C, after 2 minutes of mixing, organic loading was 3.45g Ni/l

EXAMPLE 9

| | | |
|---|---|---|
| 1. 2-Diethylaminoethanethiol . HCl | 4.8 | 3.0 |
| 2. Adogen 364 | 53.0 | 8.0 |
| 3. Decanol | 20.8 | 8.0 |
| 4. Xylene | 21.4 | 9.8 |

T = 60° C, Organic loading = 2.35g Ni/l

EXAMPLE 10

| Component | Vol. % | Moles of Component Moles of Ni(or Co) |
|---|---|---|
| 1. 2-Diethylaminoethanethiol . HCl | 6.0 | 3.0 |
| 2. N,N-Diethylcyclohexylamine | 37.3 | 12.0 |
| 3. Decanol | 38.9 | 12.0 |
| 4. Xylene | 17.6 | 6.4 |

T = 56° C,
Organic loading = 2.68g Ni/l

EXAMPLE 11

| Component | Composition |
|---|---|
| 1. Thionalid | 2.15 g |
| 2. Decanol | 23.00 ml |
| 3. Toluene | 2.88 ml |
| 4. p-nonylphenol | 1.15 ml |
| 5. Primene JMT (Rohm & Haas) | 1.00 ml |

A. 75.0 of a 3.8 g/l Ni solution having a pH of 9.5 were treated at 60° C. with 30 ml of an organic extractant having the composition set forth above. Organic loading was 3.23 g Ni/l.

B. 60 ml of a 3.8 g/l Ni solution having a pH of 10.8 were treated at 60° C. with 30 ml of an organic extractant having the composition set forth above. Organic loading was 4.23 g Ni/l.

EXAMPLE 12

| | |
|---|---|
| 1. Thionalid | 2.64 g |
| 2. Decanol | 22.00 ml |
| 3. Toluene | 2.75 ml |
| 4. DIBK (diisobutylketone) | 2.75 ml |
| 5. p-nonylphenol | 1.10 ml |
| 6. Primene JMT (Rohm & Haas) | 1.10 ml |

A. 50 ml of the 3.8 g/l Ni solution were mixed with 5.0 ml of a 4.992 g/l Co solution. This 55.0 ml sample of aqueous cobalt and nickel was then mixed with 14.8 ml of an extractant having the composition set forth above at 55° C. Organic loading was 4.94 g/l Ni (40.5%) and 1.59 g/l Co (98.4%).

B. 1.0 ml of Adogen 364 (Ashland Co., Organic amine) was mixed with a 14.8 ml sample of the extractant set forth above under argon. This 15.8 ml sample of extractant was mixed with 55 ml of the mixed nickel and cobalt aqueous solution set forth immediately above. Organic loading was 3.73 g/l Ni (34.3%) and 1.23 g/l Co (98.9%).

EXAMPLE 13

| Component | Composition |
|---|---|
| 1. Thionalid | 2.4 g |
| 2. Decanol | 8.6 ml |
| 3. Methanol | 15.0 ml |
| 4. Adogen 382 (Ashland Co.) | 15.4 ml |
| T = 60° C., volume of aqueous nickel (3.8 g/l) = 75.0 ml Organic loading = 4.43g Ni/l | |

EXAMPLE 14

| | |
|---|---|
| 1. 2-mercaptoacetanilide | 1.1 g |
| 2. Decanol | 11.0 ml |
| 3. Toluene | 1.5 ml |
| 4. Adogen 364 (Ashland) | 5.0 ml |
| T = 50° C, 55 ml of aqueous nickel (3.8 g/l, pH = 9.5) were mixed with 18.6 ml of the extractant. Organic loading = 1.32g Ni/l | |

EXAMPLE 15

| Component | Vol. % | Moles of Component Moles of Cobalt |
|---|---|---|
| 1. 2-N-Decylaminoethanethiol | 2.04 | 2.4 |
| 2. Decanol | 86.83 | 133.8 |
| 3. Xylene | 11.13 | 20.34 |

An aqueous cobalt solution (pH = 10.5) having a cobalt content of 2.1 g Co/l was mixed with the extractant. Oganic loading was 1.80 g/l cobalt.

EXAMPLE 16

| | | |
|---|---|---|
| 1. 2-N-Decylaminoethanethiol | 2.04 | 2.4 |
| 2. Decanol | 86.83 | 133.8 |
| 3. Primene JMT (Rohm & Haas) | 2.93 | 2.4 |
| 4. Adogen 382 (Ashland Co.) | 8.19 | 4.4 |
| T = 50° C, pHaq. = 10.5 Organic loading = 1.29 g/l Co | | |

Copper or iron ions, if present in the pregnant liquors compete with nickel and cobalt for association with the mercaptide ion in the extractant. Copper is not stripped by carbon monoxide and accordingly, would have to be bled out. Iron, in general, is believed to follow the cobalt chemistry. There are many known methods of separating iron and cobalt carbonyl.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing descriptions, and all changes which come within the meaning and range of equivalency of the claims are therefore intended to be embraced therein.

We claim:

1. A process for extracting metal values selected from the group consisting of nickel and cobalt from aqueous solutions containing ions of at least one of said metal values into an organic solvent, said process comprising the steps of:

providing an extractant comprising a solution of an organic, water immiscible solvent containing a substantially water insoluble mercaptan selected from the group consisting of:

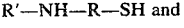

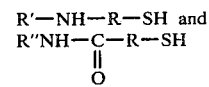

wherein R' is selected from the group consisting of hydrogen, alkyl groups containing between 1 and 20 carbon atoms, aryl substituted alkyl groups containing between 1 and 12 carbon atoms, and aryl groups substituted with a radical selected from the group consisting of hydrogen, halogen, aryl, and lower alkyl ($C_1$-$C_6$), and R is an alkyl group containing 1-10 carbon atoms; and, contacting the aqueous solution with a pH not below 3.5 with the extractant for a sufficient amount of time to extract a portion of at least one of said metals from the aqueous solution into the organic solvent.

2. The process as set forth in claim 1 wherein the extractant comprises:

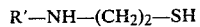

wherein R' is selected from the group consisting of alkyl groups having between 5 and 20 carbon atoms, and aryl substituted alkyl groups containing between 1 and 12 carbon atoms.

3. The process as set forth in claim 1 wherein the compound is:

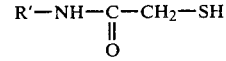

wherein R' is selected from the group consisting of alkyl groups having between 5 and 20 carbon atoms, and aryl substituted alkyl groups containing between 1 to 12 carbon atoms.

4. The process as set forth in claim 1 wherein the solvent comprises a solvent system which includes at least one water immiscible polar solvent.

5. A process for extracting metals selected from the group consisting of cobalt and nickel from aqueous solutions thereof, said process comprising the steps of:

providing a solution of an organic, water immiscible solvent containing a mercaptan selected from the group consisting of α-mercapto N-2-napthylacetamide, thioglycolic acid anilide, 2-N-decylaminoethane thiol, 2-(p-fluoroaniline)-ethanethiol, and 2-N-diethylaminoethane thiol, and, contacting the aqueous solution with a pH not below 3.5 with the extractant for a sufficient amount of time to extract a portion of at least one of said metals from the aqueous solution into the organic solvent.

6. A process for extracting metals selected from the group consisting of cobalt and nickel from aqueous solutions thereof, said process comprising the steps of:

providing a solution of an organic, water immiscible solvent containing a mercaptan selected from the group consisting of:

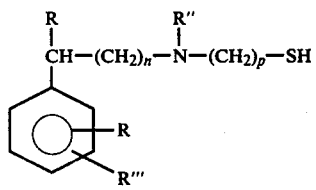   1.

wherein
n = 0, 1, 2, or 3,
p = 2 or 3
R and R''' = hydrogen, aryl, or saturated alkyl ($C_1$-$C_6$),
R' = Hydrogen or alkyl ($C_1$-$C_6$) and
R'' = Hydrogen, methyl, or ethyl;

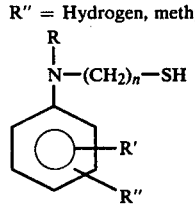   2.

wherein
n = 2, 3, or 4
R = hydrogen, methyl or ethyl, and
R' and R'' = Hydrogen, aryl, or saturated alkyl ($C_1$-$C_6$);

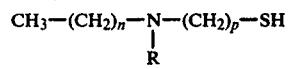   3.

wherein
n ≧ 3,
p = 2 or 3, and
R = hydrogen, methyl or ethyl;

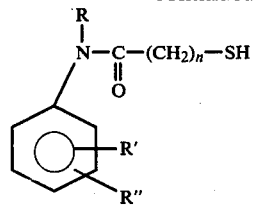   4.

where in
n = 1, 2, or 3
R = hydrogen, methyl, or ethyl, and
R'' and R' = hydrogen, aryl, or saturated alkyl ($C_1$-$C_6$),

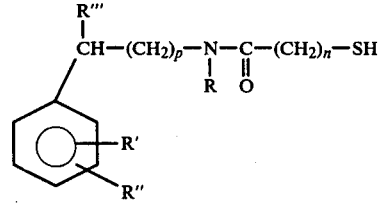   5.

wherein
n = 1, 2, or 3,
R''' and R = hydrogen, methyl or ethyl,
p = 0, 1, or 2, and
R'' and R' = hydrogen, aryl, or saturated alkyl ($C_1$-$C_6$);

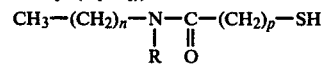   6.

where in
n ≧ 3
R = hydrogen, methyl, or ethyl, and
p = 1, 2, or 3;

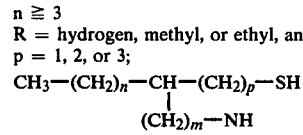   7.

wherein
n ≧ 3
m = 0, 1, 2, or 3, and
p = 2 or 3; and

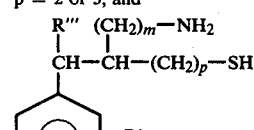   8.

wherein
m = 0, 1, 2, or 3,
p = 2 or 3,
R''' = hydrogen, methyl or ethyl, and
R' and R'' = hydrogen, aryl, or saturated alkyl ($C_1$-$C_6$); and, contacting the aqueous solution with a pH not below 3.5 with the extractant for a sufficient amount of time to extract a portion of at least one of said metals from the aqueous solution into the organic solvent.

* * * * *